United States Patent [19]

Riley

[11] Patent Number: 4,917,353

[45] Date of Patent: Apr. 17, 1990

[54] VACUUM PROBE AND METHOD

[75] Inventor: A. Douglass Riley, Winnipeg, Canada

[73] Assignee: The Boeing Company, Seattle, Wash.

[21] Appl. No.: 272,112

[22] Filed: Nov. 15, 1988

[51] Int. Cl.[4] .............................................. F16L 37/28
[52] U.S. Cl. ................................. 251/148; 251/149.6; 156/382
[58] Field of Search ............................ 251/149.6, 148; 156/382, 285, 289, 323, 500

[56] References Cited

U.S. PATENT DOCUMENTS

| 54,204 | 4/1866 | Presbrey | 425/389 |
|---|---|---|---|
| 286,693 | 10/1883 | Fried | 425/389 |
| 1,784,817 | 12/1930 | Bronson | 285/100 |
| 2,322,043 | 6/1943 | McCune | 303/88 |
| 2,411,743 | 11/1946 | Morner | 144/281 |
| 2,944,523 | 7/1960 | Werstein | 121/32 |
| 2,962,757 | 12/1960 | Slemmons et al. | 18/17 |
| 2,999,272 | 9/1961 | Warnken | 18/19 |
| 3,137,898 | 6/1964 | Geringer | 18/45 |
| 3,187,590 | 6/1965 | Duggan | 74/13 |
| 3,410,144 | 11/1968 | Noz et al. | 74/18.1 |
| 3,610,563 | 10/1971 | Allen | 249/65 |
| 3,666,600 | 5/1972 | Yoshino | 156/382 |
| 3,674,394 | 7/1972 | Wiltshire | 425/112 |
| 4,018,253 | 4/1977 | Kaufman | 141/65 |
| 4,417,638 | 11/1983 | Harvey | 180/125 |
| 4,554,036 | 11/1985 | Newsom | 156/94 |
| 4,626,122 | 12/1986 | Harrison et al. | 403/51 |

Primary Examiner—A. Michael Chambers
Attorney, Agent, or Firm—Joan H. Pauly

[57] ABSTRACT

A vacuum probe (20,120) with an upwardly and inwardly sloping frustoconical outer sidewall (26,126) incorporates a connector (50,150) which forms the male half of a vacuum line quick connect/disconnect fitting. An axial passageway (48,148) extends through the probe (20,120) and has an automatic shutoff valve positioned therein. Attachment of a vacuum line to the connector (50,150) opens the passageway (48,148). Sealing tape (66,166) is positioned around the outer sidewall (26,126), and the probe (20,120) is positioned between a vacuum pressure bag (8) and a workpiece (4,6). A vacuum is applied between the bag (8) and the workpiece (4,6) to seal the bag (8) around the tape (66,166) and to evacuate air between the bag (8) and the workpiece (4,6). The probe body (120) may be integrally formed. Alternatively, the probe body (22) may be formed separately from a vacuum line fitting (34,36) which defines the axial passageway (48) and is received into an axial opening (28) in the body (22).

19 Claims, 4 Drawing Sheets

VACUUM PROBE AND METHOD

TECHNICAL FIELD

This invention relates to vacuum probes and methods for using vacuum probes and, more particularly, to a vacuum probe which has an outer sealing surface on which sealing material is positioned and a method of using the same.

BACKGROUND ART

The use of fiber reinforced/resin matrix composite materials in the manufacture of articles and components in becoming increasingly widespread in a number of industries, including the aircraft industry. Such composite materials include, for example, graphite fiber reinforced/epoxy resin matrix materials and glass fiber reinforced/polyimide resin matrix materials. In a common manufacturing procedure for producing articles and components from composite materials, a plurality of layers of the material are held onto a mold, and the mold with the lay-up thereon is placed in an autoclave to cure the resin matrix. During the curing process, the lay-up is covered by a vacuum pressure bag which transmits the autoclave pressure uniformly over the surface of the lay-up. The uniform pressure produces a high quality finished article or component and is particularly important in the manufacture of aircraft parts which must meet stringent tolerance limitations and/or structural strength requirements. In preparation for the curing procedure, a vacuum probe is positioned under the bag and is connected to a vacuum line. A vacuum is applied through the line and the probe is evacuate air between the bag and the lay-up. This urges the bag against the lay-up so that the desired uniform pressure will be achieved.

A number of problems have arisen in connection with the use of conventional vacuum probes. A major problem is that conventional vacuum probe structures do not provide a sufficiently reliable seal between the bag and the probe around the opening in the bag through which the probe extends. In a commonly used type of vacuum probe, the bag and an annular sealing gasket are clamped between two probe body parts. During the clamping procedure, the body parts are twisted relative to each other. This relative twisting tends to cause the bag to wrinkle or bunch and thereby prevent a reliable seal between the bag and the probe. Since the sealing surfaces are not visible, the presence of wrinkling or bunching cannot be detected and the quality of the seal cannot be inspected visually. If the seal is lost during the curing process, the entire lay-up must be discarded. The discarding of lay-ups adds significantly to the overall cost of producing the parts.

Conventional probes are relatively difficult and time consuming to use. They include a plurality of parts which must be assembled each time the probe is used. The parts can become separated from each other between uses. Therefore, even more time may be required to locate the parts before the probe can be assembled for use. Conventional probes are also relatively expensive to manufacture because of the plurality of parts, the relatively complex structure, and the need to machine the sealing surfaces. In addition, although excess resin from the lay-up is usually absorbed by a breather layer positioned between the bag and the lay-up and an extra pad of breather material is conventionally positioned under the probe, resin from the lay-up can get into the probe. The resin can foul the screw connections of the probe and thereby necessitate either an expensive cleaning procedure or the discarding of the entire probe. All of these factors add to the overall cost of manufacturing the parts.

Still another problem associated with the conventional vacuum probe design is that the entire vacuum line quick connect/disconnect fitting is positioned above the sealing surfaces, and therefore, the probe has a high profile. Vacuum hoses are heavy and must stretch over a long distance during the curing procedure. The relatively high probe profile creates relatively high leverage tending to tip the probe over during the curing process. A tipped probe can mar the surface of the lay-up and create pressure voids. This ruins the lay-up so that it must be discarded.

One approach to solving the problem of unreliable seals is to modify the basic two-part body and gasket probe structure described above. Examples of modifications that improve seal reliability are providing a pressure plate and lock ring to seal against the gasket, and providing concentric seal ridges on the probe top. In the latter example, the ridges are machined into the probe top and seal into the gasket to allow it to slide over the bag. Another type of two-part probe body developed by the assignee of the applicant is the subject matter of a copending U.S. patent application Ser. No. 06/901,855, filed Aug. 29, 1986, in the name of Matin et al. and entitled "Non-Metallic Vacuum Probe". In the probe disclosed in that application, a bearing washing is positioned adjacent to the gasket to avoid twisting of the bag upon assembly of the probe. The two parts of the probe body are tightened together by twisting the upper body part. The body parts engage each other by a ramp and lug arrangement. The upper body part extends down through a central opening in the lower body part and has a center passageway that borders on and communicates with an indentation on the bottom surface of the lower body part.

Vacuum probe arrangements used in the manufacture or repair of composite material parts are disclosed in U.S. Pat. No. 3,666,600, granted May 30, 1972, to S. Y. Yoshino; and U.S. Pat. No. 4,554,036, granted Nov. 19, 1985, to C. M. Newton, U.S. Pat. No. 2,411,743, granted Nov. 26, 1946, to H. G. Morner discloses a vacuum connection on a bag used in molding plastic-bonded sheet material, such as plywood. Apparatus for evacuating bags of food for home freezing is disclosed in U.S. Pat. No. 4,018,253, granted Apr. 19, 1977, to S. I. Kaufman. The open end of the bag is pulled through a hollow retainer and is sealed between the retainer and a cap to which an evacuation tube is connected. U.S. Pat. No. 4,417,638, granted Nov. 29, 1983, to B. F. Harvey, discloses a self-sealing elastomeric grommet for the rigid portion of an air pallet which has a bayonet connection to an air supply nozzle.

Molding apparatus in which the edge of an internal pressure bag around the opening in the bag is positioned in a groove or clamped is disclosed in U.S. Pat. No. 54,204, granted Apr. 24, 1866, to J. L. Presbrey; U.S. Pat. No. 3,137,898, granted June 23, 1964, to E. E. Geringer; U.S. Pat. No. 3,610,563, granted Oct. 5, 1971, to P. E. Allen; and U.S. Pat. No. 3,674,394, granted July 4, 1972, to A. J. Wiltshire. In the Geringer and Allen apparatus, fibrous material is positioned between the bag and the mold, and air is driven out of the material through a vent by the introduction of resin. In the Wiltshire apparatus, a sealing ring is positioned around the circumference of a sliding core of the air supply fitting between the material being molded and the mold. The core is driven outwardly to a final molding position by pressure supplied to the bag. In this position, the sealing ring is received in a sealing ring seat provided between the counterbore in which the fitting slides and the inner mold surface. The sealing ring prevents resin from entering the counterbore and fouling the sliding surface of the core.

Other types of connections between a pressure bag and an air supply fitting are shown in U.S. Pat. No. 1,784,817, granted Dec. 16, 1930, to A. E. Bronson; and U.S. Pat. No. 2,999,272, granted Sept. 12, 1961, to E. P. Warnken. Molding apparatus in which the outer and/or inner periphery of a pressure diaphragm is clamped is disclosed in U.S. Pat. No. 286,693, granted Oct. 16, 1883, to J. Fried; and U.S. Pat. No. 2,962,757, granted Dec. 6, 1960, to C. O. Slemmons et al. Fried also discloses an air supply hose coupling to a chamber above the diaphragm. In the Slemmons et al. apparatus, air is exhausted from the space between the upper mold portion and the workpiece and from the space between the workpiece and the diaphragm. A diaphragm or gasket-like member with peripheral edge portions that are received in a groove or are clamped are disclosed in U.S. Pat. No. 2,322,043, granted June 15, 1943, to J. C. McCune; U.S. Pat. No. 2,944,523, granted July 12, 1960, to F. A. Werstein; U.S. Pat. No. 3,187,590, granted June 8, 1965, to J. E. Duggan; and U.S. Pat. No. 3,410,144, granted Nov. 12, 1968, to J. L. Noz et al. Grommet-like annular fittings clamped to sheet material are disclosed in U.S. Pat. No. 4,626,122, granted Dec. 2, 1986, to B. Harrison et al.; and French Pat. No. 1,194,397, published Nov. 9, 1959, in the name of R. Discry.

The above-cited patents and the prior art that is disclosed and/or cited therein should be studied for the purpose of putting the present invention into proper perspective relative to the prior art.

DISCLOSURE OF THE INVENTION

A subject of the invention is a method of urging a vacuum pressure bag against a workpiece and evacuating air between the bag and the workpiece. According to an aspect of the invention, the method comprises providing a vacuum probe having a bottom portion, a top portion from which a vacuum line connector projects upwardly, and outer sidewall means sloping upwardly and laterally inwardly from the bottom portion to the top portion. Sealing material is positioned to extend around and sealingly engage the sidewall means. An opening is formed in the bag. The probe with the sealing material positioned thereon is placed between the bag and the workpiece, and the connector is extended through the opening. The bag is sealed around the sealing material. A vacuum line is connected to the connector. A vacuum is applied between the bag and the workpiece through the vacuum line and the connector, to evacuate air between the bag and the workpiece. The step of forming an opening in the bag comprises forming the opening to be large enough to receive the connector therethrough and small enough to be surrounded by the sealing material.

The step of sealing the bag around the sealing material is preferably carried out by applying a vacuum between the bag and the workpiece through the vacuum line and the connector to bring the bag into sealing contact with the sealing material. This preferred manner of sealing the bag has the advantages of being quick and easy and of providing a good reliable seal between the bag and the sealing material. In most cases, no further action, such as pressing the bag against the sealing material manually, is required.

A preferred feature of the invention is the use of a bag which is at least substantially transparent and visually determining whether a complete seal between the bag and the sealing material has been achieved. This preferred feature helps minimize the chances of the seal being lost during the curing procedure. The visual determination is made possible by the transparent nature of the bag and by the manner in which the sealing material is positioned relative to the probe body. Another preferred feature of the invention is providing the sealing material in the form of sealing tape and positioning the tape around the sidewall means. This procedure is preferred since it maximizes the speed and ease with which the method may be carried out. In addition, since sealing tape is readily available, this feature helps to minimize the cost of carrying out the method.

Another object of the invention is a vacuum probe. According to an aspect of the invention, the probe comprises a bottom portion, a top portion, outer sidewall means, a vacuum line connector projecting upwardly from the top portion for attaching the probe to a vacuum line, and an axial passageway. The bottom portion has a bottom surface with a recess formed therein for developing a vacuum between the probe and a workpiece. The sidewall means slopes upwardly and laterally inwardly from the bottom portion to the top portion. The axial passageway extends through the connector and communicates with the recess. The sidewall means forms an outer annular sealing surface for receiving sealing material to sealingly engage a vacuum pressure bag when the probe is positioned between the bag and a workpiece with a connector projecting through an opening in the bag and a vacuum is applied through the axial passageway.

The sidewall means preferably includes an indexing indentation to guide placement of the sealing material on the sealing surface. This feature increases the speed and ease with which the probe may be used. The sloping sidewall means may have various shapes. In the preferred embodiments, the sidewall means is substantially frustoconical. The frustoconical surface provides a good sealing surface and is relatively easy to manufacture.

In one of the preferred embodiments of the probe, the bottom portion, top portion, sidewall means, and connector are all formed by a single integral body which defines the axial passageway. The body may be made from a relatively inexpensive material and be used as a throw-away item. With the cost of manufacture kept to a minimum, disposing of the item after its use can be less costly than cleaning procedures to remove resin from the body. Alternatively, the body may be made from a material that is sufficiently temperature resistant to allow the body to be cleaned of resin by burning the resin. Burning the resin off the body is a relatively inexpensive cleaning procedure.

The probe preferably further comprises a shutoff valve element positioned in the axial passageway and biased upwardly to close the passageway. The connector is adapted to receive a mating connector having means to move the valve element downwardly to open the passageway. When the body is of a type which may be cleaned of resin by burning the resin off, the valve element is preferably removable from the body so that the body may be cleaned separately. The feature of a valve element incorporated into the probe eliminates the necessity for positioning a vacuum line fitting containing a valve on the top of the probe. This in turn reduces the overall profile of the probe to avoid the tilting problem discussed above.

Another embodiment of the probe comprises a main body that forms the bottom portion and the sidewall means and that has a central axial opening extending therethrough. A vacuum line fitting is removably received into the axial opening. The fitting includes the connector and defines the axial passageway. In the preferred form of this embodiment, the body includes an attaching flange extending includes an upper portion and a separate lower portion releasably attachable to the upper portion. Each of the upper and lower portions has a radial shoulder. The shoulders are positioned to engage opposite radial surfaces of the flange to removably attach the fitting to the body. Preferably, sealing means is provided between the flange and at least one of the shoulders.

Like the first embodiment, this embodiment preferably includes a shutoff valve element, as described above. Preferably, the recess extends radially outwardly from the axial opening, and the fitting extends downwardly in the axial opening and terminates in a bottom surface substantially axially aligned with the top of the recess. This preferred positioning of the fitting relative to the recess has the advantage of allowing the profile of the probe to be minimized. In addition, it permits the body to be reused after resin enters the probe. All that is needed is to remove the fitting and replace it with a clean fitting.

The embodiment with the separate fitting may also include the preferred feature of an indexing indentation discussed above.

The method and apparatus of the invention consistently provide a reliable seal between the bag and the probe. Therefore, the high cost of lost lay-ups and bagging material is avoided. The system of the invention not only provides a good reliable seal but, in its preferred form, also makes it possible to easily and quickly inspect the seal. The probe of the invention is easy and inexpensive to manufacture. In addition, its design avoids most of the problems of lost parts experienced with conventional probes. The probe of the invention is also easy to use, thereby making the method of the invention easy to carry out. The savings in time and effort provided by the system of the invention in turn create significant cost savings. As discussed above, the probe of the invention also eliminates or substantially reduces the cleaning expenses associated with conventional probes. The problem of tipping of vacuum probes is also avoided since the design of the probe of the invention permits the vertical profile of the probe to be minimized.

These and other advantages and features will become apparent from the detailed description of the best modes for carrying out the invention that follows.

BRIEF DESCRIPTION OF THE DRAWINGS

In the drawings, like element designations refer to like parts throughout, and.

BEST MODES FOR CARRYING OUT THE INVENTION

Figure 1:
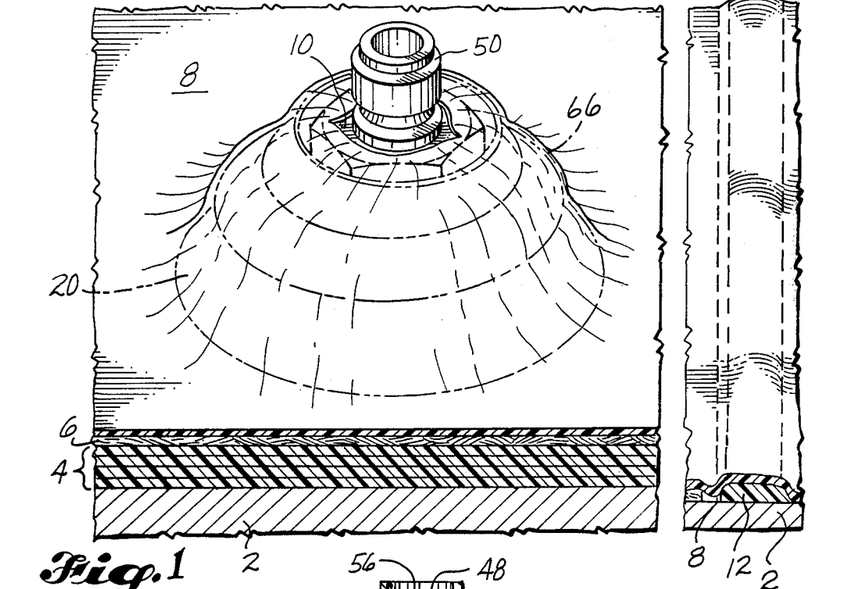
FIG. 1 is a pictorial view of the first preferred embodiment of the probe in use, with portions shown in section.
Figure 2:
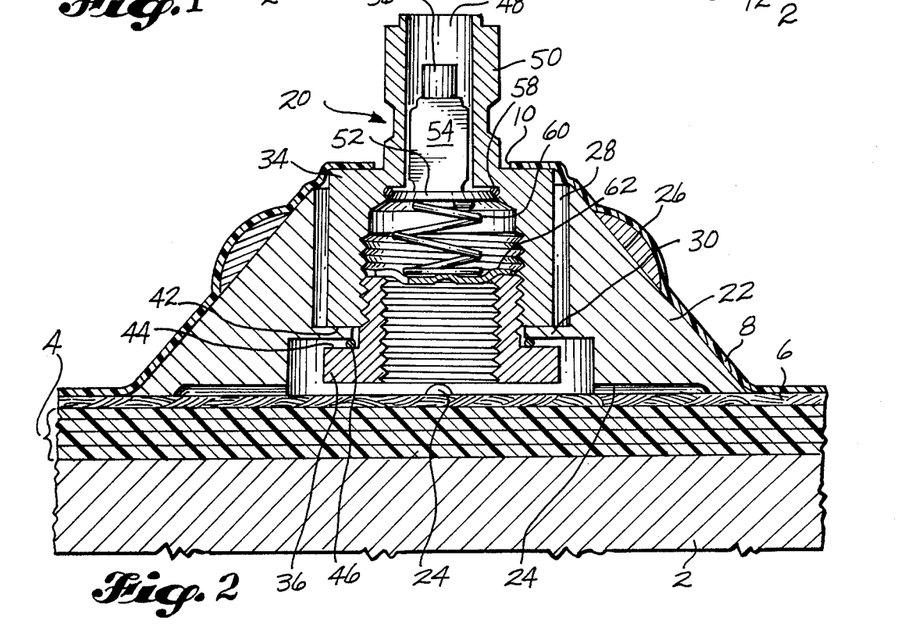
FIG. 2 is a vertical sectional view of the probe and associated structures shown in FIG. 1.
Figure 7:
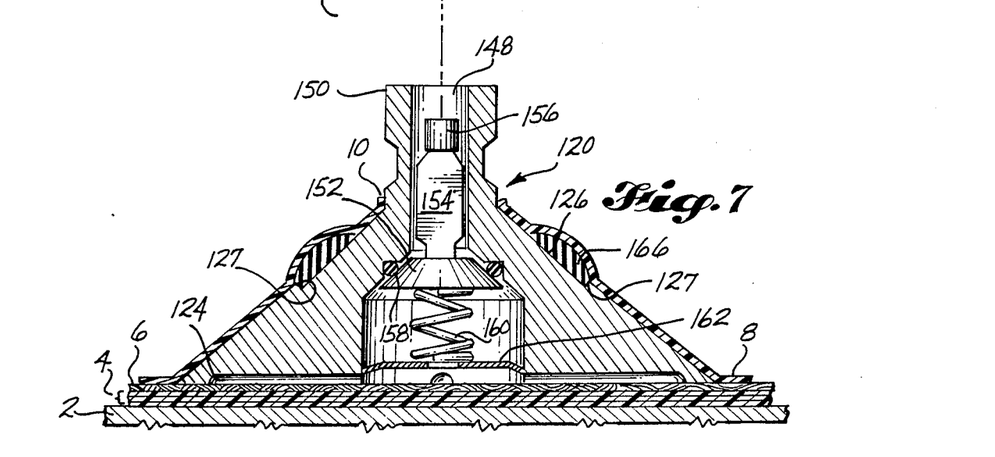
FIG. 7 is like FIG. 2 except that it shows the second embodiment of FIG. 6.

The drawings show two probes 20,120 that are constructed according to the invention and that also constitute the best modes of the apparatus of the invention currently known to the applicant. The drawings also illustrate the best mode for carrying out the method of the invention currently known to the applicant. In FIGS. 1, 2, and 7, the method and apparatus of the invention are shown being used in connection with a procedure for curing an article made from a plurality of plies of composite material. It is anticipated that the primary application of the invention will be in the type of procedure illustrated in FIGS. 1, 2, 5, and 7. However, it is of course to be understood that the method and apparatus of the invention may also be used to advantage in connection with other types of materials and in other types of procedures which employ a vacuum pressure bag.

Figures 4, 5:
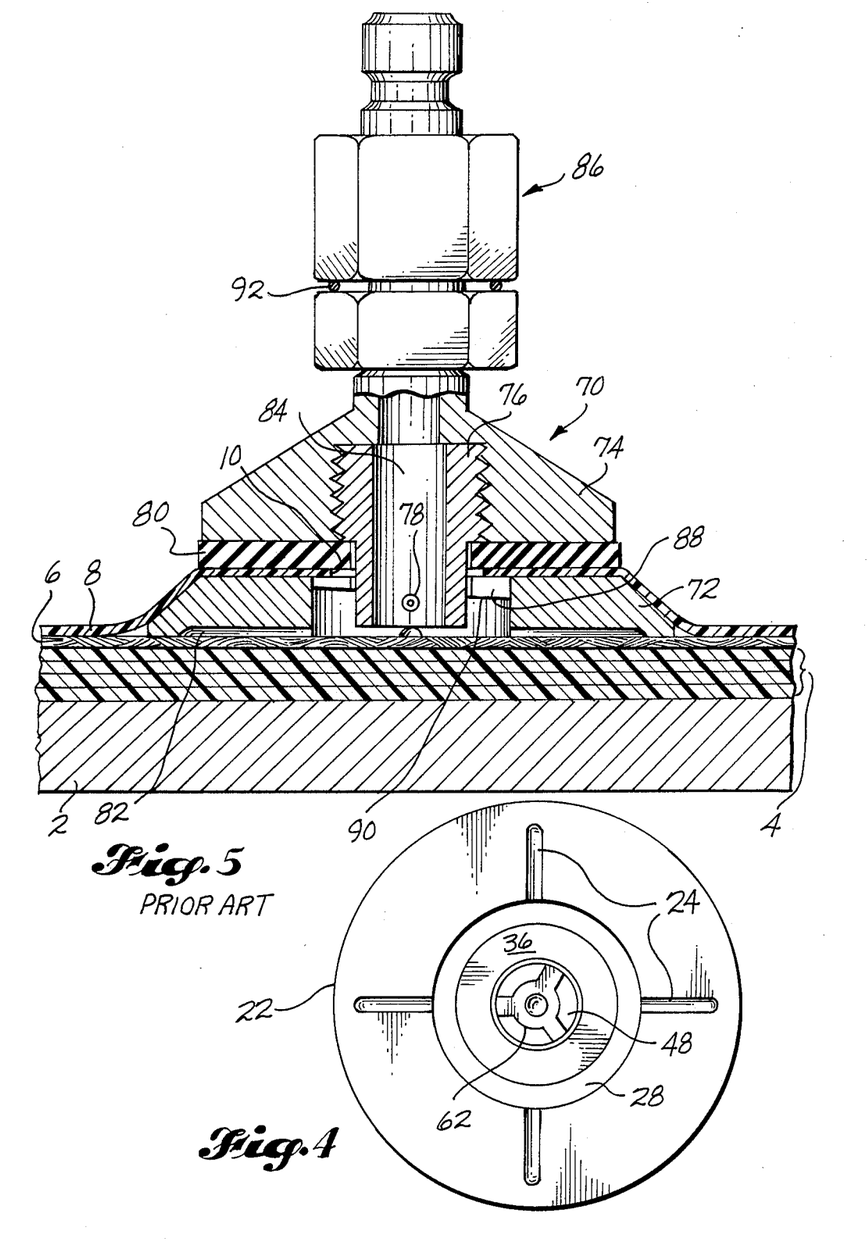
FIG. 4 is a bottom plan view of the probe shown in FIGS. 1-3.
FIG. 5 is a view like FIG. 2 except that is shows, for the purpose of comparison, a conventional type of probe.

FIG. 5 illustrates a typical example of the conventional type of vacuum probe discussed above. The body of the probe 70 includes separate lower and upper portions 72,74. In use, an annular gasket 80 and the portion of the vacuum bag 8 surrounding an opening 10 therein are received between the two body portions 72,74. A connecting member 76 secures the body portions 72,74 together. The connecting member 76 is threadedly attached to the upper body portion 74. A pin 78 extends through a radial hole in the bottom of the connecting member 76. The pin 78 is received through a slot 88 in an annular center flange formed by the lower body portion 72. When the connecting member 76 is twisted, the ends of the pin 78 move along the sloping lower surface 90 of the flange to grip the body portion 72. The bottom surface of the probe body 72,74 has a recess formed therein to facilitate development of a vacuum between the probe body 72,74 and the workpiece 4,6. The recess includes the bottom portion of a center axial opening through the lower body portion 72 and four circumferentially spaced indentations 82 extending radially outwardly from the axial opening. The connecting member 76 and upper body portion 74 form an axial passageway 84 for application of a vacuum A vacuum fitting 86 of a conventional type is positioned on the top of the upper body portion 74 for connecting a vacuum line to the probe 70. Some of the problems that are encountered in the use of the type or probe shown in FIG. 5, including tipping due to the high profile and an unreliable seal, are discussed above.

The first preferred embodiment 20 of the probe of the invention is shown in FIGS. 1-4. The probe 20 includes a main body 22 and a vacuum line fitting 34,36. The body 22 has a central axial opening 28 extending therethrough into which the fitting 34,36 is received. The bottom surface of the body 22 has a recess formed therein for developing a vacuum between the workpiece 4,6 and the probe body 22. The recess includes the bottom portion of the axial opening 28 and four radially extending indentations 24 similar to the indentations 82 shown in FIG. 5. FIG. 4 is a bottom plan view of the probe 20 showing the arrangement of the indentations 24. The outer sidewall 26 of the body 22 slopes upwardly and laterally inwardly from the flat bottom surface of the body 22 to the top of the body 22. Preferably, the sidewall 26 is substantially frustoconical and slopes upwardly and radially inwardly. The sidewall 26 forms a sealing surface, as described below.

The fitting 34,36 which is received into the axial opening 28 in the probe body 22 includes an upper portion 34 and a separate lower portion 36. The upper and lower portions 34,36 threadedly engage each other by means of internal threads 38 on the upper portion 34 and external threads 40 on the lower portion 36. A male vacuum line connector 50 projects upwardly from the top of the upper portion 34. As shown in FIGS. 1 and 2, in the assembled probe 20, the connector 50 projects axially upwardly and outwardly from the axial opening 28 in the probe body 22. The lower fitting portion 36 and most of the upper fitting portion 34 below the connector 50 are received within the axial opening 28. This arrangement helps to minimize the overall height of the probe 20.

The manner in which the fitting 34,36 is attached to the probe body 22 is shown in FIG. 2. The body 22 has an annular attaching flange 30 which projects radially inwardly into a mid portion of the axial opening 28. The lower surface of the upper fitting portion 34 forms a radial shoulder 42. The bottom portion of the lower fitting portion 36 has an annular flange projecting radially outwardly therefrom which forms a second radial shoulder 44. These shoulders 42,44 face each other and are positioned to engage opposite radial surfaces of the attaching flange 30 on the probe body 22. This provides an easy means for removably attaching the fitting 34,36 to the body 22. Preferably, a seal, such as the O-ring 46 shown in FIGS. 2 and 3, is provided between the lower shoulder 44 and the flange 30.

The arrangement of a probe body 22 and a separate fitting 34,36 has the advantage of readily incorporating a standard type of vacuum line fitting 34,36. The fitting 34,36 is the same type as the fitting 86 shown in FIG. 5. In the conventional assembly shown in FIG. 5, the O-ring 92 directly engages both fitting portions 72,74 without an intervening attaching flange. The incorporation of a standard fitting 34,36 into the probe structure helps reduce the cost of the probe 20 and allows the overall height of the probe and vacuum fitting assembly to be minimized.

Figure 3:
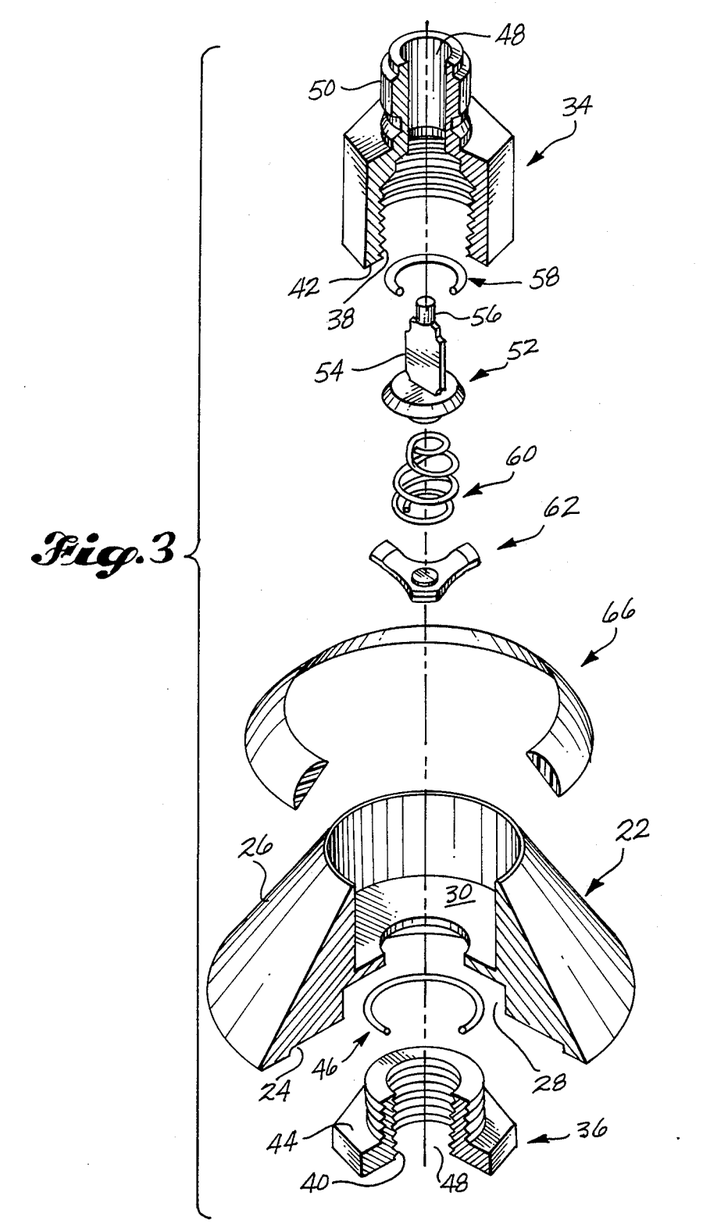
FIG. 3 is an exploded pictorial view of the probe shown in FIGS. 1 and 2.

Referring to FIGS. 2 and 3, the fitting 34,36 of the probe 20 forms an axial passageway 48 which extends through the fitting 34,36 and communicates with the center portion of the recess on the bottom surface of the probe 20. As can be seen in FIG. 2, the bottom of the axial passageway 48 is substantially axially aligned with the top of the recess. When a vacuum line is connected to the connector 50, a vacuum may be applied between the workpiece 4,6 and a vacuum pressure bag 8 via the recess at the bottom of the probe 20 and the axial passageway 48.

The fitting 34,36 preferably includes a shutoff valve element 52 positioned in the axial passageway 48. The valve element 52 is biased upwardly by a spring 60 to close the axial passageway 48. The beveled side surface of the valve element 52 is urged against an O-ring 58 carried by the upper fitting portion 34 to seal the passageway 48. The spring 60 has opposite ends that abut the valve element 52 and a spring clip 62, respectively. Preferably, the spring clip takes the form of the Y-clip 62 shown in Figs. 2 and 3. The clip 62 is retained in position in the passageway 48 by the abutment of its outer edges against the inner radial end surface of the lower fitting portion 36. The valve element 52 has a projection 54,56 that projects upwardly from the main part of the element 52 into the narrow portion of the axial passageway 48 extending through the connector 50. The projection 54,56 includes a flat portion 54 which projects from the main part of the element 52 and guides sliding axial movement of the element 52. The projection 54,56 terminates at its upper end in a cylindrical portion 56 with a diameter smaller than the diameter of the surrounding passageway 48.

The connector 50 forms the male half of a standard vacuum line quick connect/disconnect fitting. When a vacuum line is attached to the probe 20, the female portion of the quick connect/disconnect on the end of the vacuum line engages the valve element 52 in a known manner to path it downwardly and thereby open the axial passageway 48. When the vacuum line is removed, the spring 60 reseats the valve element 52 against the O-ring 58 to seal the passageway 48.

FIGS. 1 and 2 illustrate the use of the probe 20 and the carrying out of the method of the invention. The probe 20 is shown in FIGS. 1 and 2 being used to urge a vacuum pressure bag 8 against a workpiece 4,6 and to evacuate air between the bag 8 and the workpiece 4,6. As used herein, the term "workpiece" includes a composite material lay-up 4 and a layer of breather material 6. The lay-up 4 comprises a plurality of plies of composite material that have been laid onto a mold 2. Additional layers of material (not shown) may also be positioned between the bag 8 and the lay-up 4. For example, a release layer may be provided to protect the surface of the lay-up 4.

In the practice of the method of the invention, sealing material 66 is positioned around the frustoconical outer sidewall 26 of the probe 20. Preferably, the sealing material is provided in the form of a strip of sealing tape 66, which is commercially available. Such tape is sufficiently sticky to readily sealingly adhere to the sidewall 26 and sufficiently plastic to readily conform to the shape of the sidewall 26. After the tape has been positioned on the sidewall 26, it forms an annular seal encompassing the probe body 22. The method also includes preparing the vacuum bag 8 to accommodate the probe 20. An opening 10 is formed in the bag 8. The opening 10 may easily be formed by cutting a small slit in the bag material. The opening 10 is made large enough to receive therethrough the connection 50 projecting from the probe body 22 but small enough to be surrounded by the sealing material 66 on the probe sidewall 26.

The probe 20 with the sealing material 66 positioned thereon is placed between the bag 8 and the workpiece 4,6, and the connector 50 is extended through the opening 10, as shown in FIGS. 1 and 2. The probe 20 would normally be positioned directly over the workpiece 4,6, as shown in FIGS. 1 and 2, but could also be positioned spaced laterally from the lay-up 4. In the latter arrangement, the layer of breather material 6 would extend laterally from the lay-up 4 to the probe 20 to provide a pathway for evacuating air between the bag 8 and the workpiece 4,6. In either case, an extra pad of breather material (not shown) is preferably provided under the probe 20 to help prevent resin from entering the probe structure. When the probe 20 is placed directly over the lay-up 4 and breather material 6, the vacuum pressure on the lay-up immediately under the probe 20 is evened out by the breather material 6. Preferably, the probe 20 is placed over a noncritical area of the lay-up 4, such as a peripheral area that will be trimmed following the curing procedure or an area where a void is to be formed following the curing procedure.

In a typical curing procedure, the bag 8 is provided in the form of a sheet of fluid tight transparent material, such as the material sold under the trademark Mylar. The sheet is cut to completely cover the workpiece 4,6. The periphery of the bagging sheet 8 is sealed by a peripheral seal 12. The seal 12 may be formed by the same sealing tape that forms the seal 66 positioned on the probe 20. The seal 12 extends around the periphery of the workpiece 43,6 and seals the periphery of the bagging sheet 8 against a peripheral portion of the mold 2 outside the lay-up 4, as shown in FIG. 1, or against a support surface on which the mold 2 has been placed.

When the bag 8 has been positioned over the workpiece 4,6 and the probe 20 has been positioned between the bag 8 and the workpiece 4,6, a vacuum line is connected to the male connector 50 projecting upwardly from the top of the probe body 22. As described above, the vacuum line includes the female half of the quick connect/disconnect which has means for opening the valve in the probe axial passageway 48. The bag 8 is sealed around the sealing material 66 on the probe sidewall 26 to prevent leakage through the opening 10 in the bag 8. The sealing of the bag 8 is preferably accomplished by applying a vacuum between the bag 8 and the workpiece 4,6 through the vacuum line and connector 50. The application of the vacuum brings the bag 8 into sealing contact with the sealing material 66. Since the bagging material is at least substantially transparent, the seal between the bag 8 and the sealing material 66 may be visually inspected to determine whether a complete seal has been achieved.

With the periphery of the bag 8 sealed by the peripheral seal 12 and the portion of the bag 8 around the opening 10 sealed against the probe 20, the bag 8 provides a complete airtight enclosure for the workpiece 4,6. Air is evacuated between the bag 8 and the workpiece 4,6 by applying a vacuum between the bag 8 and the workpiece 4,6 through the vacuum line and the connector 50. This urges the bag 8 against the workpiece 4,6 and completes preparation of the assembly for the autoclave curing procedure. The curing procedure is know in the art and is not a part of the present invention. Therefore, it will not be described further herein.

Figure 6:
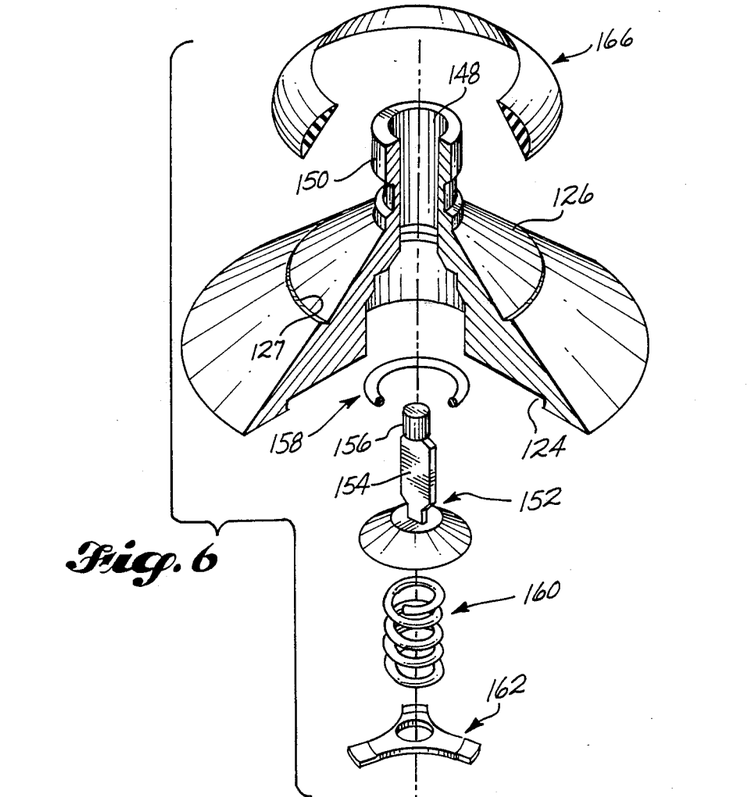
FIG. 6 is an exploded pictorial view of the second preferred embodiment of the probe.

The second preferred embodiment of the probe 120 is shown in FIGS. 6 and 7. In this embodiment, the probe body is integrally formed with the vacuum line fitting. The single integral probe body includes the bottom recessed surface, the sloping frustoconical sidewall 126, the top portion from which the connector 150 projects, and the connector 150 itself. The integral probe body defines an axial passageway 148 for applying a vacuum between the bag 8 and the workpiece 4,6 via the recess formed on the bottom of the probe 120. The recess is similar to that of the first embodiment shown in FIGS. 1-4 and includes the bottom portion of the axial passageway 148 and circumferentially spaced radially extending indentations 124.

As in the first embodiment, a valve element 152 is positioned in the axial passageway 148 and is biased by a spring 160 to sealingly engage an O-ring 158 to close the axial passageway 148. A projection 154,156 projects from the valve element 152 and includes a flat guide portion 154 and an upper cylindrical portion 156. A spring clip 162 holds the spring 160 in position and functions as a lower spring abutment. The clip 162 is removably retained in the passageway 148 by suitable means (not shown) such as engagement of the clip edges in a groove formed on the passageway sidewall.

The outer frustoconical sidewall 126 has a shallow indexing indentation 127 formed thereon. The indentation 127 has a depth of, for example, 1/16 of an inch. The indentation 127 provides a guide for an operator to properly position the sealing material 166 on the sidewall 126. Although no corresponding indexing indentation is shown in FIGS. 2 and 3, the first embodiment is also preferably provided with such an indexing indentation to increase the ease end accuracy of positioning the sealing material 66.

The operation of the second embodiment shown in FIGS. 6 and 7 in relation to the curing procedure is essentially the same as the operation of the embodiment shown in FIGS. 1-4. However, cleaning procedures relating to the two probes 20,120 may differ. As noted above, in the embodiment with the separate vacuum line fitting 34,36, all that is required to prepare the probe 20 for subsequent use when resin has entered the probe 20 is to remove the fitting 34,36 and replace it with a clean fitting 34,36. In the integral embodiment of FIGS. 6 and 7, the probe body may be made from a material that is highly temperature resistant. This allows the probe body to be cleaned of resin by burning the resin off the body. Prior to the burning off of the resin, the valve element 152 is preferably removed by disengaging and removing the clip 162. Following removal of the clip 162, the valve element 152, the spring 160, and the O-ring 158 may be removed so that the probe body is the only part subjected to the high temperature cleaning procedure.

As used herein, the terms "bottom", "top", "upper", "lower", "upwardly", and the like refer to the usual use orientation shown in FIGS. 1, 2, and 7. The use of these terms it not intended to limit the invention to the illustrated use orientation. It is intended to be understood that the probe of the invention may be used in non-upright orientations and that the method of the invention maybe practiced with non-upright probes without departing from the spirit and scope of the invention.

It will be obvious to those skilled in the art to which this invention is addressed that the invention may be used to advantage in a variety of situations. Therefore, it is intended to be understood by those skilled in the art that various modifications and omissions in form and detail may be made without departing from the spirit and scope of the invention as defined by the following claims.

What is claimed is:
1. A vacuum probe comprising a bottom portion having a bottom surface with a recess formed therein for developing a vacuum between the probe and a workpiece, a top portion, outer sidewall means sloping upwardly and laterally inwardly from said bottom portion to said top portion, a vacuum line connector projecting upwardly from said top portion for attaching the probe to a vacuum line, and an axial passageway extending through the connector and communicating with the recess; said sidewall means forming an outer annular sealing surface for receiving sealing material to sealingly engage a vacuum pressure bag when the probe is positioned between the bag and workpiece with the connector projecting through an opening in the bag and a vacuum is applied through the axial passageway.

2. The probe of claim 1, in which said sidewall means includes an indexing indentation to guide placement of sealing material on the sealing surface.

3. The probe of claim 1, in which said sidewall means is substantially frustoconical.

4. The probe of claim 2, in which said sidewall means is substantially frustoconical.

5. The probe of claim 1, in which said bottom portion, said top portion, said sidewall means, and the connector are all formed by a single integral body which defines the axial passageway.

6. The probe of claim 5, which further comprises a shutoff valve element positioned in the axial passageway and biased upwardly to close said passageway; and in which the connector is adapted to receive a mating connector having means to move the valve element downwardly to pen said passageway.

7. The probe of claim 6, in which the valve element is removable from said body, and said body is made from a material that is sufficiently temperature resistant to allow the body to be cleaned of resin by burning the resin.

8. The probe of claim 5, in which said sidewall means includes an indexing indentation to guide placement of sealing material on the sealing surface.

9. The probe of claim 7, in which said sidewall means includes an indexing indentation to guide placement of sealing material on the sealing surface.

10. The probe of claim 1, comprising a main body that forms said bottom portion and said sidewall means and that has a central axial opening extending therethrough, and a vacuum line fitting removably received into said axial opening; said fitting including said connector and defining said passageway.

11. The probe of claim 10, in which said body includes an attaching flange extending radially inwardly into said axial opening; and said fitting includes an upper portion and a separate lower portion releasably attachable to said upper portion, each of said upper and lower portions having a radial shoulder, and said shoulders being positioned to engage opposite radial surfaces of the flange to removably attach said fitting to said body.

12. The probe of claim 11, further comprising sealing means between the flange and at least one of said shoulders.

13. The probe of claim 10, in which said fitting includes a shutoff valve element positioned in said passageway and biased upwardly to close said passageway, and said connector is adapted to receive a mating connector having means to move the valve element downwardly to open said passageway.

14. The probe of claim 11, in which said fitting includes a shutoff valve element positioned in said passageway and biased upwardly to close said passageway, and said connector is adapted to receive a mating connector having means to move the valve element downwardly to open said passageway.

15. The probe of claim 10, in which the recess extends radially outwardly from said axial opening, and said fitting extends downwardly in said axial opening and terminates in a bottom surface substantially axially aligned with the top of the recess.

16. The probe of claim 11, in which the access extends radially outwardly from said axial opening, and said fitting extends downwardly in said axial opening and terminates in a bottom surface substantially axially aligned with the top of the recess.

17. The probe of claim 13, in which the recess extends radially outwardly from said axial opening, and said fitting extends downwardly in said axial opening and terminates in a bottom surface substantially axially aligned with the top of the recess.

18. The probe of claim 14, in which the recess extends radially outwardly from said axial opening, and said fitting extends downwardly in said axial opening and terminates in a bottom surface substantially axially aligned with the top of the recess.

19. The probe of claim 10, in which said sidewall means includes an indexing indentation to guide placement of sealing material on the sealing surface.

* * * * *

UNITED STATES PATENT AND TRADEMARK OFFICE
CERTIFICATE OF CORRECTION

PATENT NO. : 4,917,353

DATED : April 17, 1990

INVENTOR(S) : A. Douglass Riley

It is certified that error appears in the above-identified patent and that said Letters Patent is hereby corrected as shown below:

Col. 1, line 14, "in", first occurrence, should be -- is --.

Col. 1, line 21, "held" should be -- laid --.

Col. 1, line 33, "is" should be -- to --.

Col. 2, line 30, "washing" should be -- washer --.

Col. 2, line 45, "Newton" should be -- Newsom --.

Col. 5, line 15, after "extending", insert:
  -- radially inwardly into the axial opening, and the fitting --.

UNITED STATES PATENT AND TRADEMARK OFFICE
CERTIFICATE OF CORRECTION

PATENT NO. : 4,917,353
DATED : April 17, 1990
INVENTOR(S) : A. Douglass Riley

It is certified that error appears in the above-identified patent and that said Letters Patent is hereby corrected as shown below:

Col. 6, line 57, there should be a period after "vacuum" (first occur).

Col. 6, line 61, "or" should be -- of --.

Col. 8, line 25, "path" should be -- push --.

Col. 8, line 56, "connection" should be -- connector --.

Col. 9, line 21, "43, 6" should be -- 4, 6 --.

Col. 10, line 51, "maybe" should be -- may be --.

Claim 6, col. 11, line 25, "pen" should be -- open --.

Claim 16, col. 12, line 27, "access" should be -- recess --.

Signed and Sealed this

Nineteenth Day of November, 1991

Attest:

HARRY F. MANBECK, JR.

*Attesting Officer*  *Commissioner of Patents and Trademarks*